United States Patent
Tracy et al.

(10) Patent No.: US 8,522,509 B2
(45) Date of Patent: Sep. 3, 2013

(54) MORTARLESS TILE INSTALLATION SYSTEM AND METHOD FOR INSTALLING TILES

(75) Inventors: Norman C. Tracy, Huntington Beach, CA (US); Charles R. Cornman, Huntington Beach, CA (US); Zosimo D. Pamaran, La Mirada, CA (US)

(73) Assignee: Custom Building Products, Inc., Seal Beach, CA (US)

( * ) Notice: Subject to any disclaimer, the term of this patent is extended or adjusted under 35 U.S.C. 154(b) by 0 days.

(21) Appl. No.: 13/102,900

(22) Filed: May 6, 2011

(65) Prior Publication Data

US 2011/0214798 A1 Sep. 8, 2011

Related U.S. Application Data

(63) Continuation-in-part of application No. 12/719,799, filed on Mar. 8, 2010, now Pat. No. 8,302,366.

(60) Provisional application No. 61/158,659, filed on Mar. 9, 2009.

(51) Int. Cl.
*E04B 1/00* (2006.01)
*E04C 1/00* (2006.01)

(52) U.S. Cl.
USPC ............. 52/746.1; 52/309.3; 52/309.1

(58) Field of Classification Search
USPC ................. 52/309.1–309.5, 309.13
See application file for complete search history.

(56) References Cited

U.S. PATENT DOCUMENTS

| | | | |
|---|---|---|---|
| 3,049,836 A | 8/1962 | Weissman | |
| 3,413,168 A | 11/1968 | Danielson et al. | |
| 4,637,184 A | 1/1987 | Radtke et al. | |
| 4,917,933 A | 4/1990 | Schluter | |
| 5,418,036 A | 5/1995 | Tokikawa et al. | |
| 5,449,540 A * | 9/1995 | Calhoun et al. | 428/42.1 |
| 5,527,853 A | 6/1996 | Landy et al. | |
| 5,647,941 A * | 7/1997 | Gunderman et al. | 156/277 |
| RE36,042 E | 1/1999 | Landy et al. | |
| 6,151,854 A | 11/2000 | Gutjahr | |
| 6,403,188 B1 * | 6/2002 | Donahue | 428/40.1 |
| 6,428,889 B1 * | 8/2002 | Nagaoka | 428/355 AC |
| 6,434,901 B1 | 8/2002 | Schluter | |
| 6,548,164 B1 * | 4/2003 | Bacon, Jr. | 428/343 |

(Continued)

FOREIGN PATENT DOCUMENTS

| | | |
|---|---|---|
| CA | 2 327 701 C | 9/2004 |
| DE | 196 20 987 C1 | 11/1997 |

(Continued)

OTHER PUBLICATIONS

International Search Report—PCT/US12/36623; dated Jul. 31, 2012.

*Primary Examiner* — Mark Wendell
(74) *Attorney, Agent, or Firm* — Scott R. Hansen; Fulwider Patton LLP

(57) ABSTRACT

The tile installation system provides a system for installing an architectural covering material to a substrate surface utilizing a plurality of release sheets where each release sheet has a top side surface and a bottom side surface. A plurality of discrete adhesive substrate portions are positioned on the top side surface of the release sheet, wherein the top side surface of the release sheet has a stronger bonding affinity with the plurality of adhesive substrate portions than the bottom side surface.

20 Claims, 12 Drawing Sheets

(56) References Cited

U.S. PATENT DOCUMENTS

| | | | |
|---|---|---|---|
| 7,338,685 B2 | 3/2008 | Sano | |
| 7,536,835 B2 | 5/2009 | Schluter | |
| 7,585,556 B2 | 9/2009 | Julton | |
| 7,888,422 B2 * | 2/2011 | Jackson et al. | 524/522 |
| 2002/0187353 A1 * | 12/2002 | Nakamura et al. | 428/416 |
| 2002/0192415 A1 * | 12/2002 | Vogler et al. | 428/40.1 |
| 2005/0266256 A1 | 12/2005 | Yamamoto et al. | |
| 2006/0107617 A1 | 5/2006 | Scott et al. | |
| 2010/0223872 A1 | 9/2010 | Taylor et al. | |

FOREIGN PATENT DOCUMENTS

| | | | |
|---|---|---|---|
| DE | 202 04 518 U1 | | 8/2002 |
| GB | 2 192 336 A | | 1/1988 |
| JP | 2002121503 | * | 4/2002 |
| NL | 9 002 083 A | | 8/1991 |
| WO | 2004/051019 A1 | | 6/2004 |
| WO | 2008/038982 A1 | | 4/2008 |

* cited by examiner

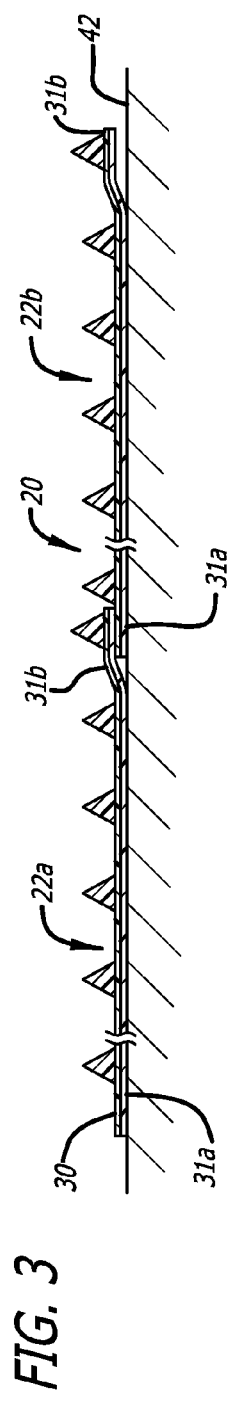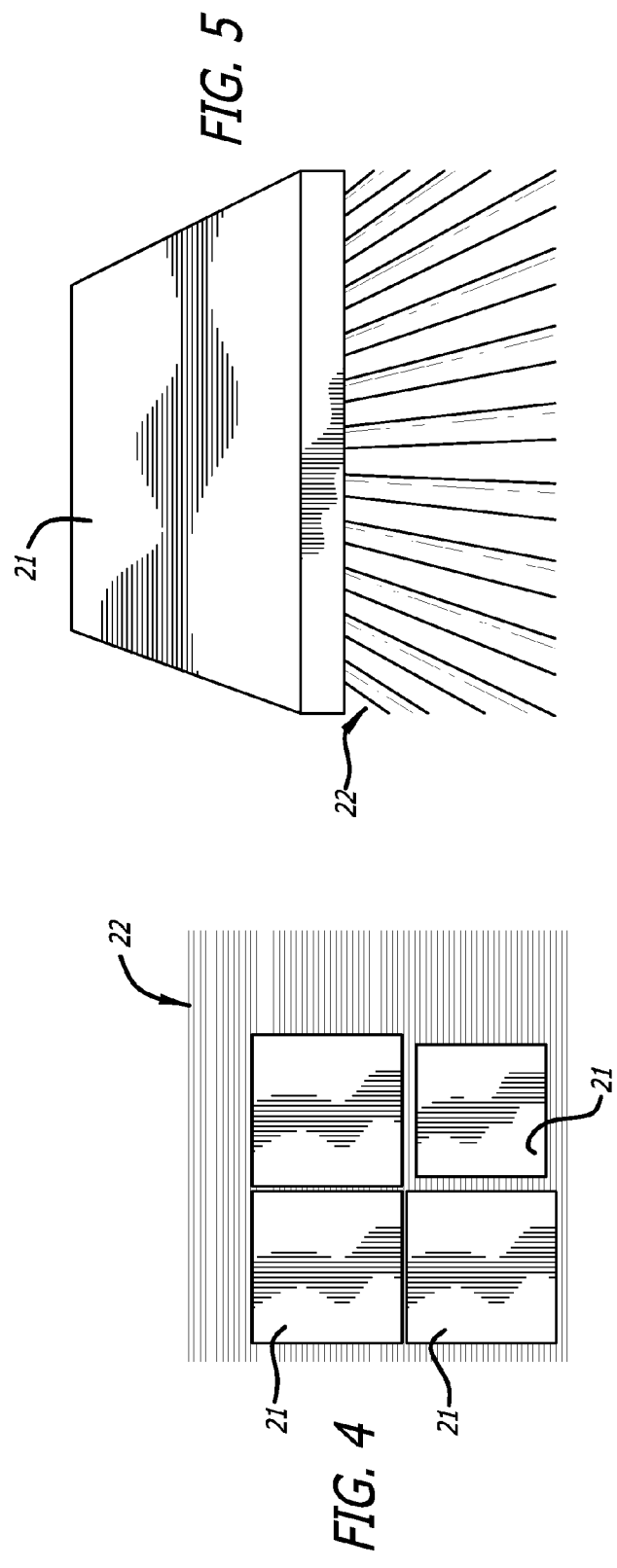

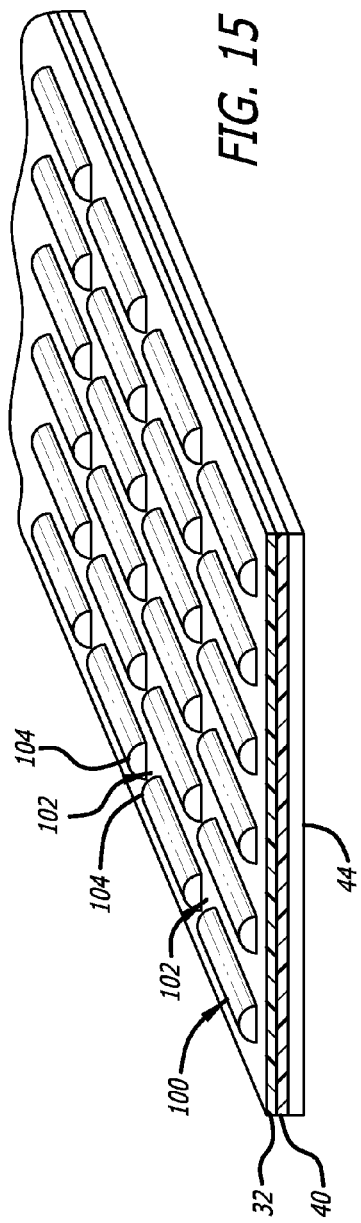
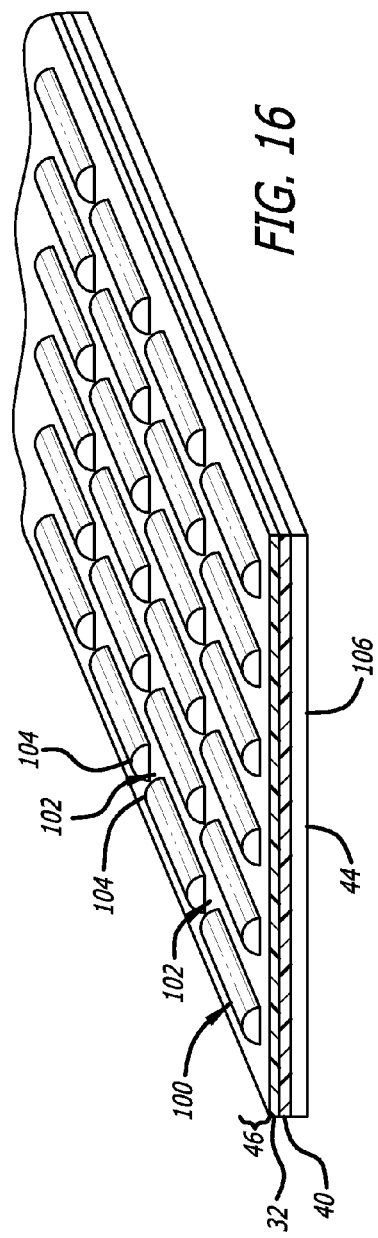

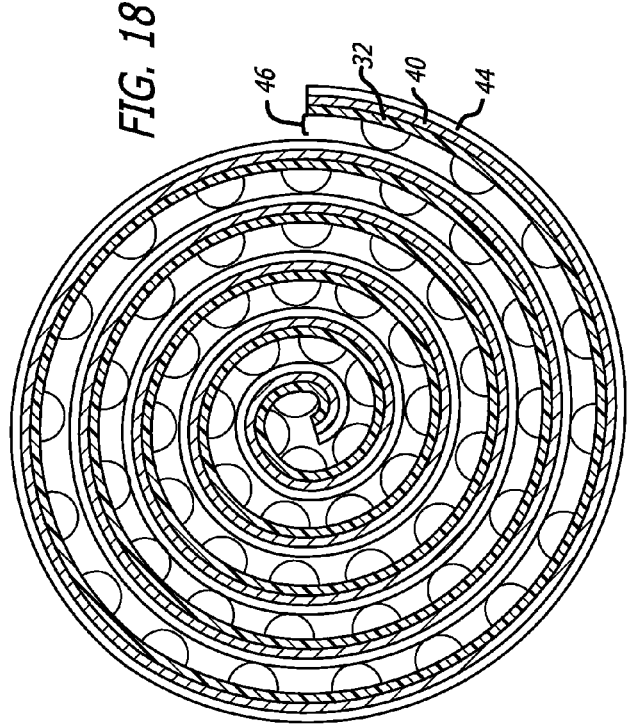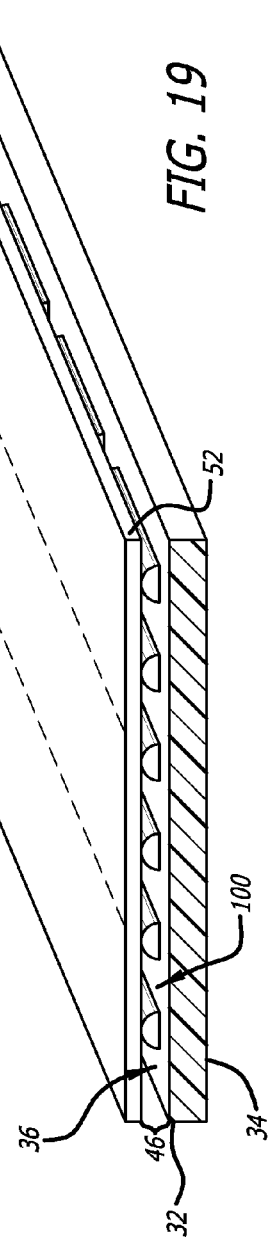

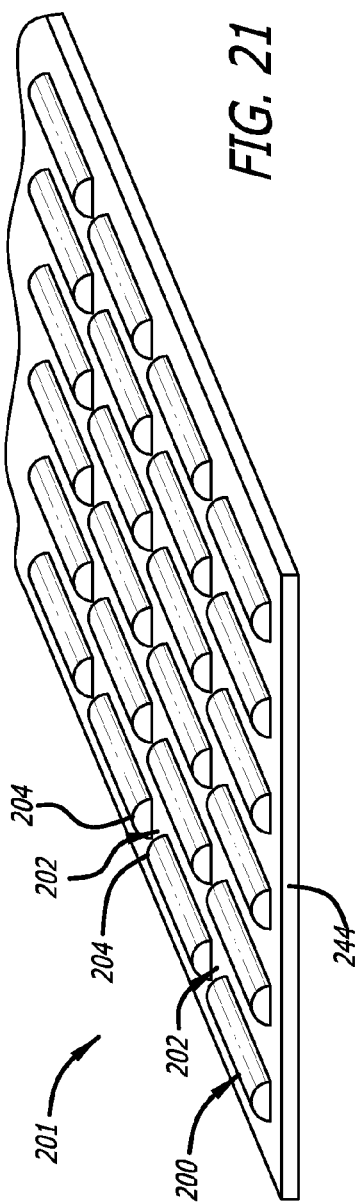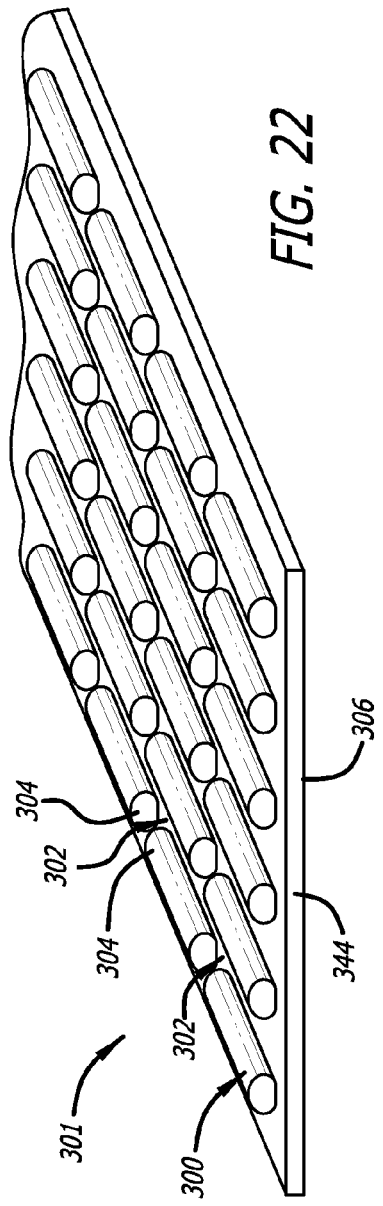

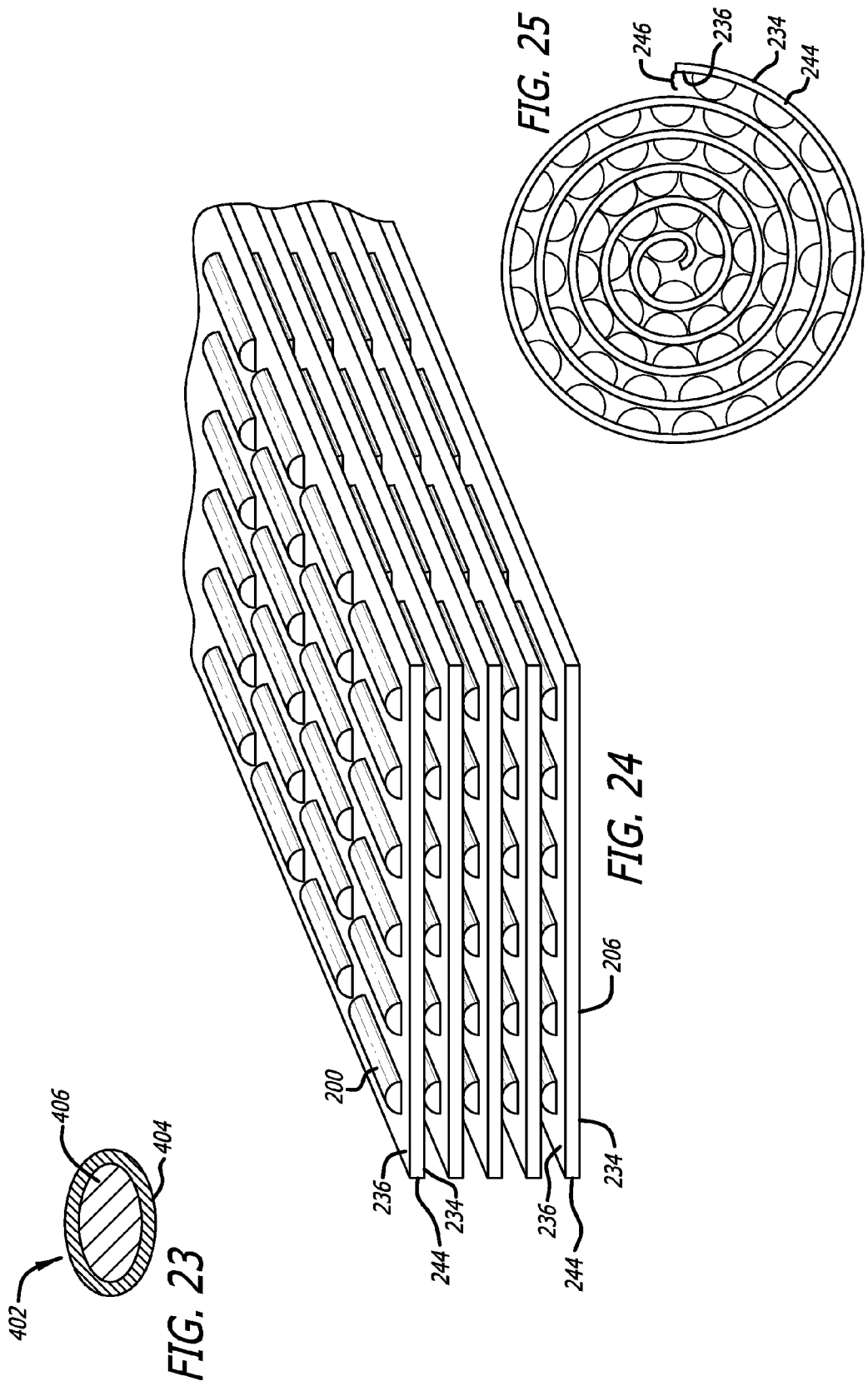

MORTARLESS TILE INSTALLATION SYSTEM AND METHOD FOR INSTALLING TILES

CROSS-REFERENCES TO RELATED APPLICATIONS

This application is a Continuation-In-Part of U.S. application Ser. No. 12/719,799, filed Mar. 8, 2010, which is based upon U.S. Provisional Application No. 61/158,659, filed Mar. 9, 2009, incorporated by reference in its entirety.

BACKGROUND OF THE INVENTION

This invention relates generally to a system and a method for installation of an architectural covering material to a substrate surface. The invention relates more particularly to mortarless installation of an architectural covering material such as tile utilizing at least one layer of adhesive and a release liner (also referred to as a carrier sheet), arranged to allow the covering material to be temporarily positioned, and re-aligned, repositioned and set as desired in a final position.

Covering materials such as tile are typically adhered to a substrate surface such as a wall or a floor using a cement-based mortar, which can be difficult and time consuming. The mortar is typically prepared by mixing a mortar powder with water until the mortar mixture has a desired pasty consistency so that the mortar mixture can be applied with a trowel. One of the drawbacks of using mortar is that mortar powder is an inherently dusty material, and while the mortar powder is being mixed with water, the dust from the mortar can cover the surrounding area. Limited exposure to mortar dust is generally believed to be safe, although it can be a nuisance if it is inhaled. Another problem with using mortar is that the mortar powder and water also must be mixed in a specified proportion, or else the mortar may not adequately adhere to the tile, or may cure improperly.

A wet mortar mixture is typically applied to the substrate surface with a notched trowel to form ridges and valleys in the mortar over a desired coverage of the surface. After the mortar is spread it must be used within a certain period of time, and tile must be set into the mortar before the mortar "closes," and loses its ability to hold the tile. A person installing tile on mortar also must take great care to ensure that the tiles are properly aligned and positioned as desired, and this can be difficult, frequently requiring readjustment of tiles that have been laid on mortar. Unfortunately, mortar also has a certain adjustment time after which the positions of tiles set on it can not be adjusted. Thus, once mortar is spread, tile must be set in a final desired position on the mortar within a specified time. If too much mortar is spread before the tiles can be properly set before the mortar "closes," or if any necessary adjustment of the positions of the tiles on the mortar has not been completed before this no longer becomes possible, the mortar and tiles must be removed, and the mortar must be discarded. In addition, the spreading of mortar commonly requires the use of many different techniques that can be critical to the ultimate success of the tile installation, such as skim coating the substrate surface, "back buttering" the tile, keeping the trowel at a specified angle in order to deliver the right amount of mortar, and the like. Another difficulty with using mortar for setting tiles is that mortar is not typically sufficient by itself to provide waterproofing. Under current practice, if tile is to be set in an area exposed to water, a separate waterproofing material typically must be added to the tile installation.

Once tile is properly set on mortar, the mortar must be allowed to cure before the tile installation can be grouted and completed. This typically can take from 4 hours (for special rapid setting mortars) to many days. Although curing commonly occurs in 16-24 hours, mortar on which tile has been set is usually allowed to cure overnight, after which the tile is substantially immovable, and is ready for grouting. Grout is typically applied by smearing grout with a rubber float across the entire surface of the set tiles and down into the grout joints between the set tiles. Excess grout is then removed as well as possible with the float, and the grout joints are "dressed" using a damp sponge.

A two-sided asphaltic membrane is currently commercially available for installing tile without mortar. However, the strength of this adhesive is not sufficient to reliably hold the tile in place, especially on vertical applications. Examples of this type of asphaltic mat with a tackier asphaltic adhesive are also too sticky for the tiles to be easily repositioned. A pressure sensitive adhesive material is also known that can be used for installing tile, and that provides dots of protruding fibers that allow the tile to be repositioned once the tile is set on the adhesive material. A double-sided adhesive tape for flooring material is also known that includes an adhesive layer with bumps and dips designed to face either a substrate surface or flooring surface. The bumps are covered by non-adhesive particles that reduce the adhesive power per unit area of the tape. Convex portions of the adhesive layer are initially placed in contact with the ground surface so that the area of contact with the substrate or flooring material is small and rendered less adherent by the non-adhesive particles, so that the adhesive tape can be moved easily. In addition, the diameter of the convex portions is 0.01-0.5 mm with spacing between ridges of 0.1-1 mm, which is too small for many tiles, which do not have a flat bonding surface. Without enough adhesive present (i.e. larger diameter) this type of double-sided adhesive tape does not provide enough surface coverage on many tiles. After the position of the flooring material is finally determined, the flooring material can be pushed toward the substrate so that both the concave and convex parts of the adhesive layer contact the substrate to firmly adhere the flooring material to the substrate. A releasing liner is provided over the adhesive layer to keep the bumps and dips of the adhesive layer intact until the adhesive layer is to be applied to the ground surface. However, in each case, an additional waterproofing must be provided if it is needed. In addition, in each case, the adhesive article is designed for use with flooring materials adhered to horizontal flooring surfaces, and not architectural covering materials that can be adhered to vertical surfaces, such as ceramic tiles adhered vertically for backsplashes, tub surrounds, and the like. Adhering flooring materials does not require the adhesive power necessary for adhering heavier, more dense tiles to vertical surfaces.

There is therefore a need for a mortarless tile installation system that does not involve the problems associated with handling and mixing a powder by a user, that can provide a secure adhesion of more dense architectural covering materials to vertical surfaces, that allows repositioning of the architectural covering materials, and that can provide a sufficient bond to a variety of tiles for installation orientations ranging from horizontal to vertical.

SUMMARY OF THE INVENTION

Briefly and in general terms, the present invention provides for a system and a method for installation of an architectural covering material such as tile to a substrate surface, with one or more layers of adhesive and one or more layers of release liners, in an arrangement that allows the covering material to be initially placed approximately in a desired position, and re-aligned and repositioned later to be permanently set in the desired position. The invention does not have limitations as to the timing of setting the covering material, and also avoids other problems commonly encountered in adhering a covering material with mortar powder. The covering material can be grouted immediately after the covering material is permanently set in the desired position. A second optional component of the system is a premixed grout that strongly adheres to the tiles and to the mat, thereby increasing the overall strength and durability of the tile installation.

Accordingly, one embodiment provides an installation system for installing architectural covering material to a substrate surface and comprises a release sheet and a plurality of discrete adhesive substrate portions positioned on the release sheet. Optionally, the system may further include discrete adhesive substrate portion comprised of an adhesive material having a shell layer and a core layer.

Another embodiment provides an installation system comprising a plurality of release sheets where each release sheet has a top side surface and a bottom side surface. A plurality of discrete adhesive substrate portions are positioned on the top side surface of the release sheet, wherein the top side surface of the release sheet has a stronger bonding affinity with the plurality of adhesive substrate portions than the bottom side surface.

In another embodiment, a method of manufacturing an adhesive sheet having glue ridges, dots, beads, cylinders, or the like and adhering the adhesive sheet to a tile, includes thermoforming a release sheet such that it forms a mold having indentations for adhesive. Liquid glue is distributed into and across the release liner to fill the thermoformed indentations in the thermoformed release liner. The adhesive side of the adhesive sheet is joined to the tile. The edges of the adhesive sheet are molded around the tile with a thermoforming machine.

In another embodiment, a method of molding a thermoplastic sheet includes molding a thermoplastic sheet to provide indentations in a preferred shape to form a mold. The mold is coated with a temporary pressure sensitive adhesive. A permanent adhesive is deposited into the mold to leave a thin layer of the permanent adhesive on the top of the adhesive sheet. The thin permanent adhesive layer is stuck to the tile back to adhere the adhesive sheet to the tile. The tile is adhered to a substrate. The thermoplastic mold is separated from the adhesive at the temporary pressure sensitive adhesive layer, and the tile is pressed onto the substrate to permanently affix the tile.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 3 is a side elevational view of a plurality of overlapping carrier sheets of a plurality of generally planar adhesive mats according to the present invention, shown without the release layers for simplicity.

FIG. 4 is a top plan view of a plurality of tiles applied edge to edge to the second adhesive layer of the generally planar adhesive mat of FIG. 1 to form a plurality of joints between adjacent sections of architectural covering material.

FIG. 5 is a side perspective view of an edge of a tile of FIG. 4 applied to the generally planar adhesive mat of FIG. 1.

FIG. 15 is a schematic perspective view of a variation of the fourth embodiment of FIGS. 11-14.

FIG. 16 is a schematic perspective view of a fifth embodiment of a generally planar adhesive mat for installation of architectural covering material to a substrate surface, according to the present invention.

FIG. 18 is an end view of a roll formed from the generally planar adhesive mat of FIG. 16.

FIG. 19 is a schematic perspective view of a sixth embodiment of a generally planar adhesive mat for installation of architectural covering material to a substrate surface, according to the present invention.

FIG. 21-22 are alternate embodiments of a tile installation system.

FIG. 23 is an illustrated example of an adhesive material for use with a tile installation system.

FIG. 24 is schematic perspective of a tile installation system.

FIG. 25 is an end view of a tile installation system.

DETAILED DESCRIPTION OF THE PREFERRED EMBODIMENTS

While conventional double-sided adhesive sheet materials exist that can be used for installing covering materials such as tile to a substrate surface without mortar, once the covering materials are initially set on this material, they typically can not be easily repositioned or realigned. While a pressure sensitive adhesive material with dots of protruding fibers and a double-sided adhesive tape with bumps and dips for flooring material can be used for installing and repositioning tile, if waterproofing is required, additional waterproofing must be provided separately. While a pressure sensitive adhesive material with protruding dots or with bumps and dips can be installed horizontally for use as flooring material, if application to a vertical substrate is required, additional adhesive strength must be provided, potentially compromising repositionability of the material.

Figure 1:
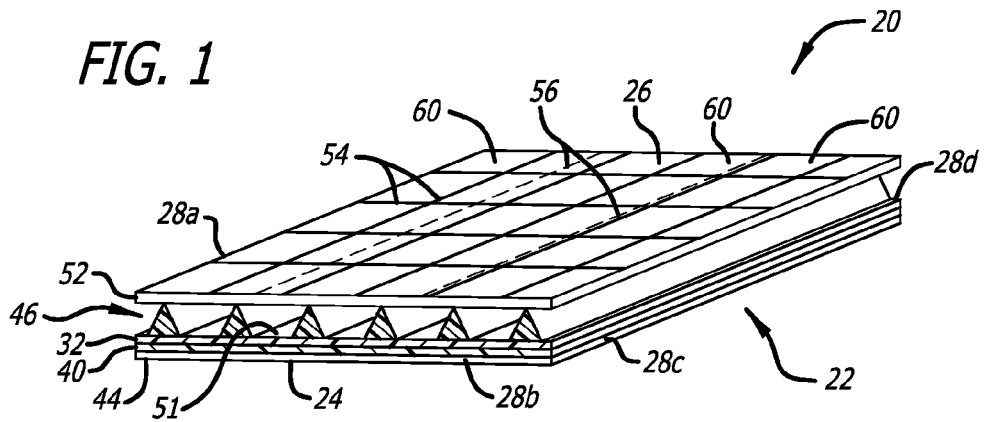
FIG. 1 is a schematic perspective view of a first embodiment of a generally planar adhesive mat for installation of architectural covering material to a substrate surface, according to the present invention.
Figure 2:
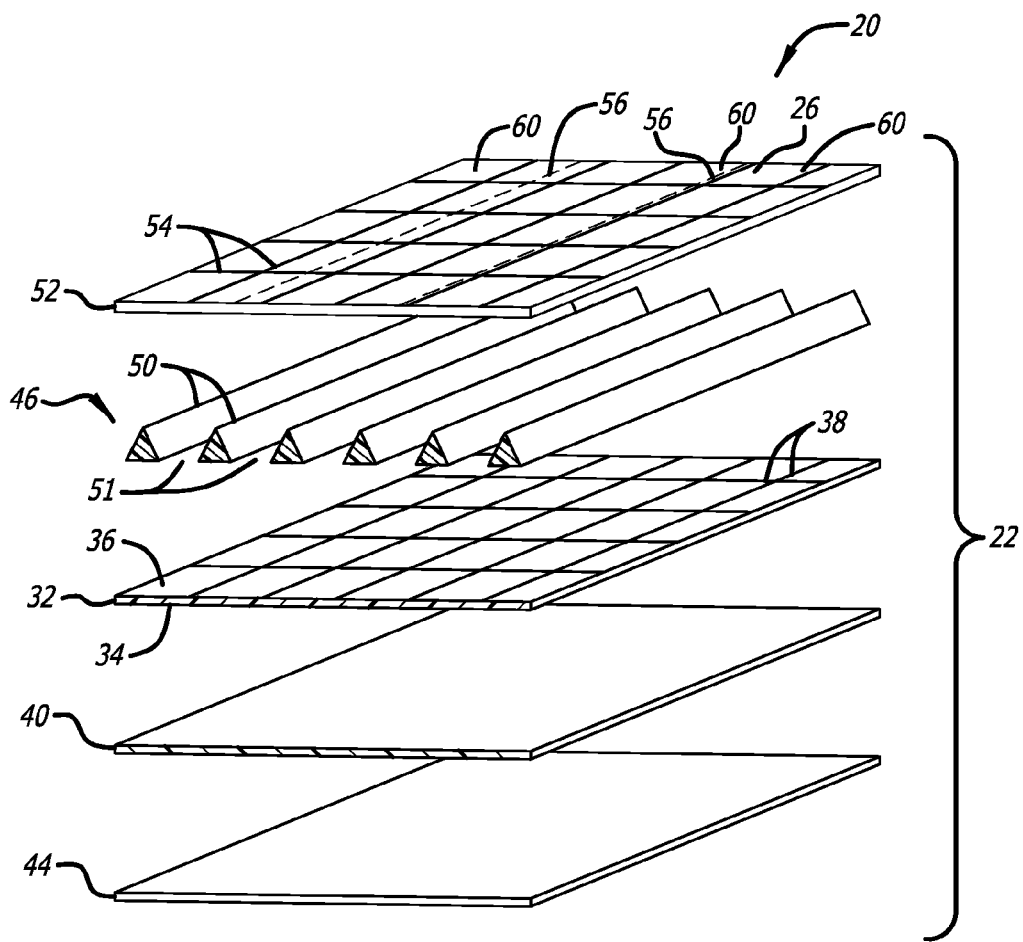
FIG. 2 is an exploded view of the generally planar adhesive mat of FIG. 1, according to the present invention.

Accordingly, in a first embodiment illustrated in FIGS. 1-5, the present invention provides for a tile installation system 20 for installing an architectural covering material 21 to a substrate surface, such as a wall, floor, counter, backsplash, tub/shower surround, or other building surface. The architectural covering material may be any commonly known in the art such as wood, carpet, tile, brick fascia, linoleum and the like, for example, whereby the adhesive mat replaces the adhesives commonly used to install the architectural covering material to the substrate. The system of the invention utilizes one or more generally planar adhesive mats 22, such as a plurality of mats 22*a, b*, each having a first side 24 and an opposing second side 26 and a plurality of perimeter side edges 28*a, b, c, d*. Referring to FIG. 3, in a presently preferred aspect, at least one perimeter side edge 30 of the mat is free of a second adhesive layer on the second side 26 of the mat to reduce the thickness at that edge portion of the mat to allow overlapping of adjacent mats to provide continuous waterproofing, without significantly changing the height of the mat from the substrate surface. The mat typically includes a plurality of perimeter side edges 31*a, b* configured to allow overlap of an adjacent perimeter side edge of an adjacent mat. Referring to FIGS. 1 and 2, each mat includes a core planar carrier member or carrier sheet 32 having a first side 34 and an opposing second side 36. The carrier sheet can be formed with a grid 38, such as by printing of the grid on the carrier sheet, for assisting a user to align the adhesive material to the substrate and to align the covering material on the mat.

The carrier sheet for the adhesive mat is preferably formed of a sheet material, such as a flexible or inflexible polymeric material, such as polyethylene or polypropylene sheets, or other similar materials, for example, although it is preferred that the carrier sheet be formed of a sheet material that is flexible, so that it can be manufactured in a roll. The carrier sheet material may also be formed of woven and non-woven mats, such as polyester or fiberglass or other similar materials, for example. The carrier sheet also preferably should be moderately deformable so that the adhesive mat can be adhered to slightly uneven surfaces without wrinkling. The carrier sheet also preferably should be impermeable to liquid water and water vapor, i.e. so that the adhesive mat can be used in wet areas such as shower and tub surrounds, although in some applications it can be desirable for the carrier to be impermeable to liquid water, but permeable to water vapor, so that the carrier sheet can act to provide protection against liquid water while still allowing the underlying substrate to "breath." In order to provide assistance to a user in aligning and positioning covering materials installed on the adhesive mat of the invention, it is also preferable that the carrier sheet should be printable, so that it can be provided with a grid, or another measuring and aligning system, for example, since this can facilitate more accurate placement of covering material on the adhesive mat. Preferred properties of the carrier sheet may be significantly different for different uses of the invention. For instance, a user may desire a flexible carrier sheet for use on tub surrounds and back splashes, a rigid carrier for flooring applications, or an inflexible carrier such as backerboard or a sheetrock-like material for use of the adhesive mat of the invention as construction panels. Deformability of the adhesive mat can allow the adhesive mat to be applied despite minor deflections in a substrate surface without creating wrinkles in the adhesive mat, which might otherwise prevent the effective placing of a covering material on the adhesive mat.

The adhesive mat includes a first adhesive layer 40 on the first side of the carrier sheet configured to adhere the adhesive mat to a substrate surface 42, illustrated in FIG. 3. The first adhesive layer can be any one or a combination of a number of cured or pressure sensitive adhesives (PSAs) commonly known in the art, including asphalt-based PSAs (rubberized or otherwise) and acrylate based PSAs, for example. The first adhesive layer should provide a rapid and permanent bond to the substrate surface. In a presently preferred aspect, the first adhesive layer is composed of a PSA applied in a thin layer to the first side of the carrier sheet.

The adhesive mat also includes a first release layer of material 44, such as a release paper, for example, removably covering the first adhesive layer to protect the first adhesive layer during manufacture and storage of the adhesive mat. The first release layer of material is also preferably printable, so that it can also be printed with a grid, or another measuring and aligning system, for example, in order to facilitate more accurate placement of covering material on the adhesive mat by a user.

The adhesive mat also includes a second adhesive layer 46 on the second side of the carrier sheet configured to adhere the architectural covering material to the adhesive mat. The second adhesive layer allows an architectural covering material to be initially positioned, and repositioned on the carrier sheet during installation, and provides a permanent bond immediately after installation. The second adhesive layer can permit repositioning of a covering material by the inherent nature of the chemicals comprising the adhesive, or by the structure of the adhesive on the mat. Referring to FIGS. 1-3, in a presently preferred aspect, the second adhesive layer can be formed as a plurality of raised structures 50 that are typically spaced apart by longitudinal gaps 51, with a second adhesive layer release layer 52 of material, such as a release paper, for example, removably covering the second adhesive layer to protect the second adhesive layer during manufacture and storage of the adhesive mat. The second release layer of material is also preferably printable, so that it may be printed such as with a grid 54, or another measuring and aligning system, for example, in order to facilitate more accurate placement of covering material on the adhesive mat by a user. The second adhesive release layer of material is also preferably modified to allow removal of portions of the release layer of material when installing tiles, in order to protect the portion of the mat to which tile is not being set from dust or other job-site debris, for example. For example, the second release layer of material can be formed with a plurality of rows of perforations 56 to define a plurality of tear lines in the second release layer of material, thereby forming a plurality of portions 60 of the second release layer of material that can be removed one at a time, to allow installation of the architectural covering material in a small area of the substrate surface. Alternatively, the second release layer of material comprises a plurality of separated portions or strips that allow each of the plurality of separate strips to be removed one at a time.

Figure 6:
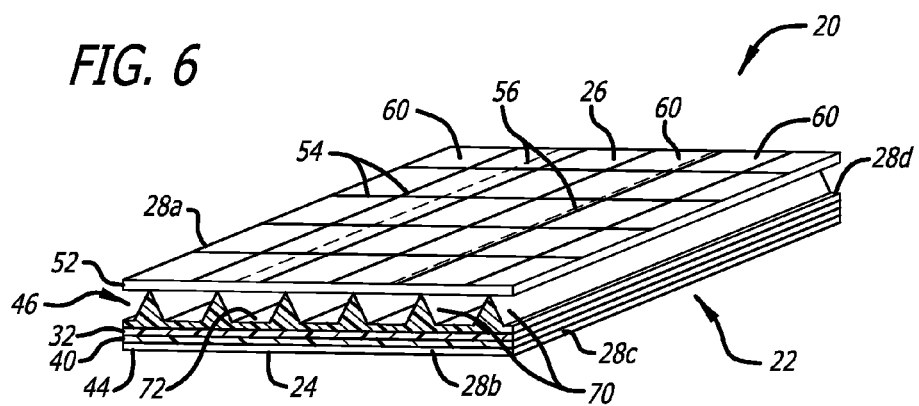
FIG. 6 is a schematic perspective view of a second embodiment of a generally planar adhesive mat for installation of architectural covering material to a substrate surface, according to the present invention.
Figure 7:
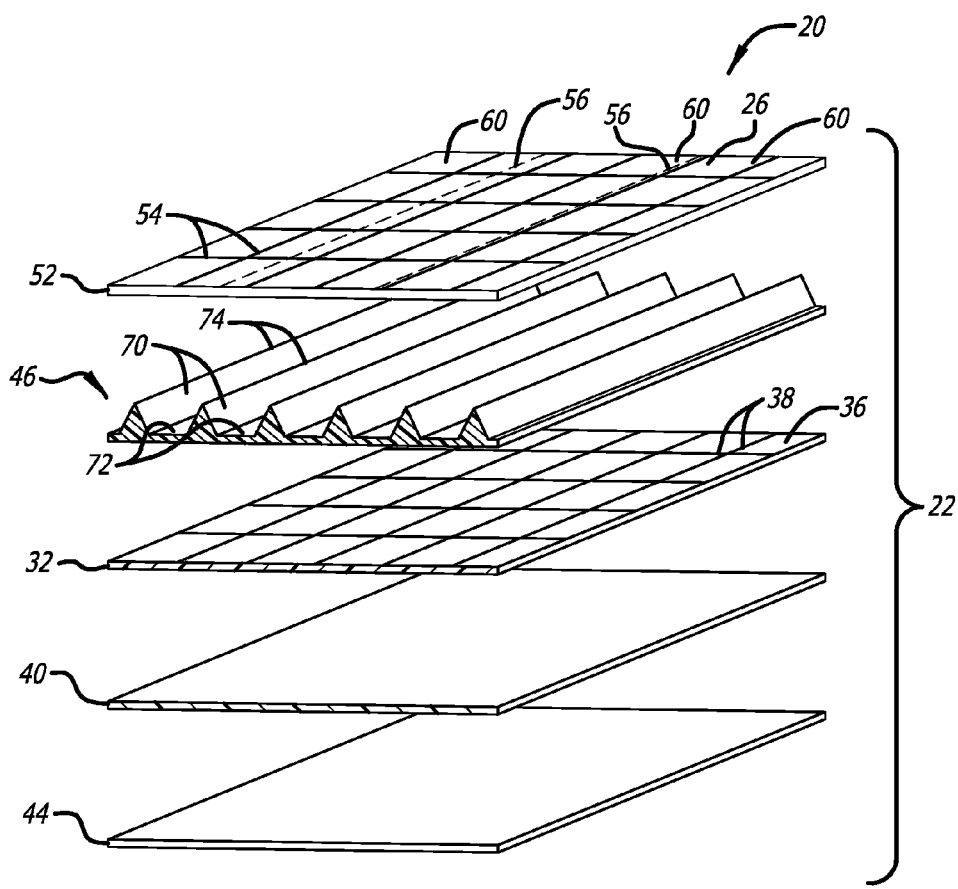
FIG. 7 is an exploded view of the generally planar adhesive mat of FIG. 6, according to the present invention.

Referring to FIGS. 6, 7, in a second presently preferred embodiment, in which like reference numerals refer to like elements of the previous embodiment, the invention provides for generally planar adhesive mat for installation of architectural covering material to a substrate surface, in which the PSA of the second adhesive layer can be formed with ridges 70 separated by grooves 72, so that if the covering material such as tile is placed gently on the tops 74 of the ridges, the covering material remains repositionable; however, when the covering material is pressed onto the PSA ridges such that the covering material is flattened and/or also contacts the grooves between the ridges, the covering material becomes immovably adhered to the second adhesive layer.

Figure 8:
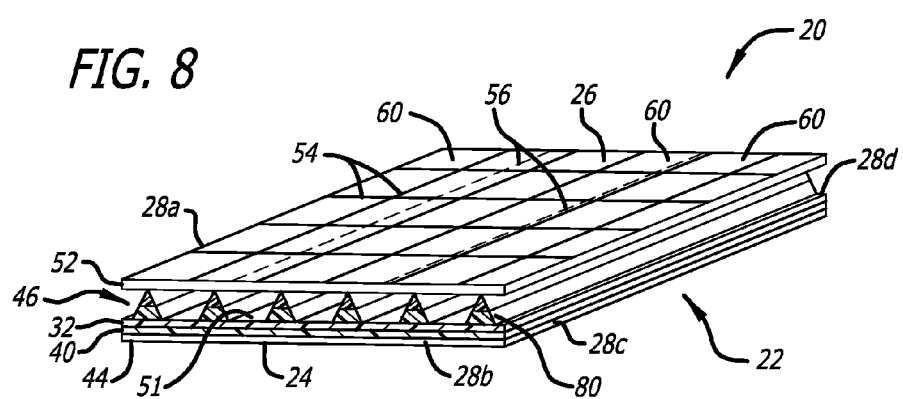
FIG. 8 is a schematic perspective view of a third embodiment of a generally planar adhesive mat for installation of architectural covering material to a substrate surface, according to the present invention.
Figure 9:
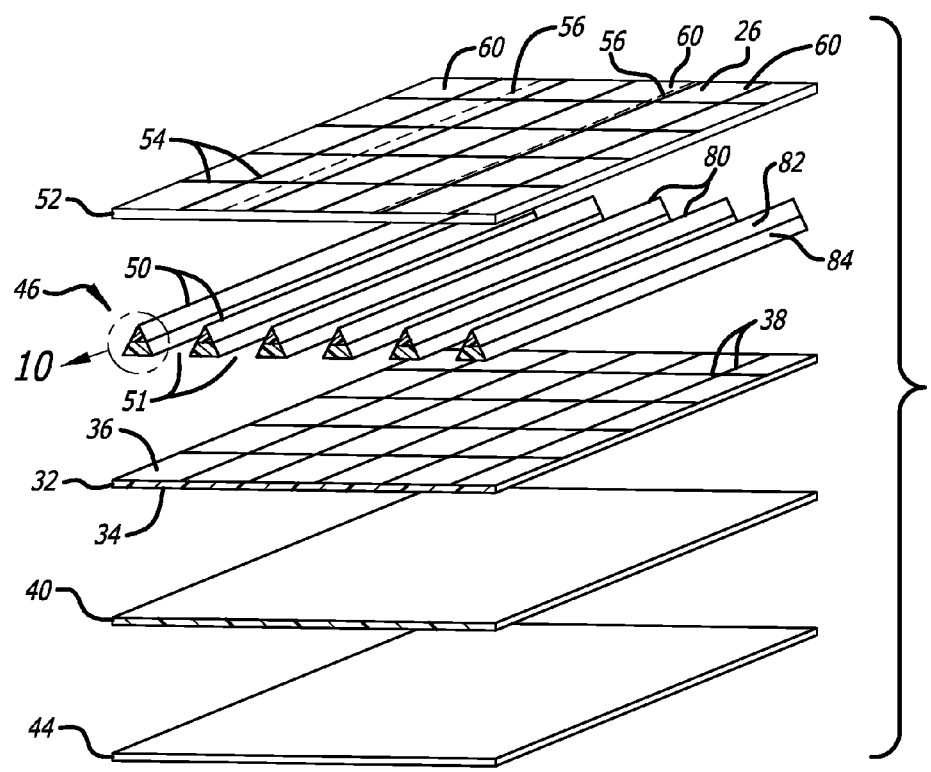
FIG. 9 is an exploded view of the generally planar adhesive mat of FIG. 8, according to the present invention.
Figure 10:
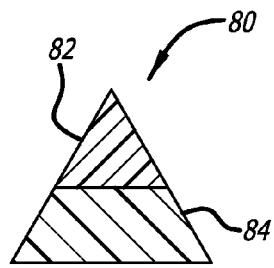
FIG. 10 is an enlarged side view of a ridge of the second layer of adhesive of FIG. 8, showing the upper and lower portions of the ridge.
Figure 11:
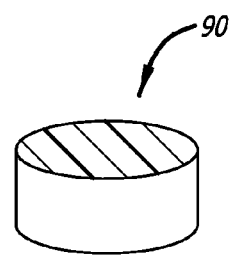
FIG. 11 is an enlarged perspective view of a ridge of the second layer of adhesive similar to the ridge of FIG. 10, formed as a dot of adhesive.

Referring to FIGS. 8-10, in a third presently preferred embodiment, in which like reference numerals refer to like elements of the previous embodiments, the second adhesive layer can be formed as spaced apart ridges 80 of two functionally different PSAs, including an upper adhesive portion 82 of the spaced apart ridges and a lower adhesive portion 84 of the spaced apart ridges. In this embodiment, the upper adhesive portion of the spaced apart ridges can be composed of a first slow set or weakly binding PSA that has enough tack to hold the covering material such as tile, but allows the covering material to be repositioned. The lower adhesive portion of the spaced apart ridges can be composed of a second fast set or more strongly binding PSA, relative to the first PSA, such that when the covering material such as tile is pressed into the mat so that the covering material contacts the lower adhesive portions of the ridges, the covering material becomes immovably adhered to the second adhesive layer. The properties of the upper adhesive portion of the spaced apart ridges are such that the covering material will be repositionable when the covering material only contacts the upper adhesive portion of the spaced apart ridges, whereas the lower adhesive portion of the spaced apart ridges will provide a permanent, immovable bond with the covering material.

Figure 12:
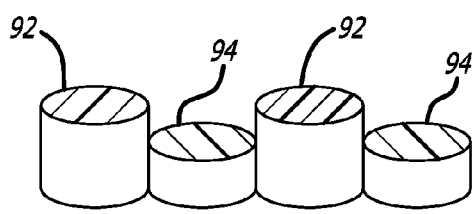
FIG. 12 is an enlarged perspective view of a portion of the second layer of adhesive formed as a series of high and low dots of adhesive.
Figure 13:
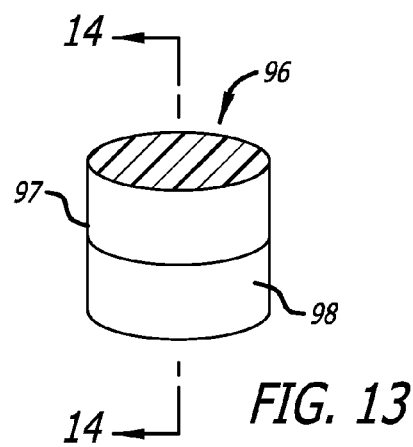
FIG. 13 is an enlarged perspective view of a portion of the second layer of adhesive formed as a series of stacked layers of adhesive dots.
Figure 14:
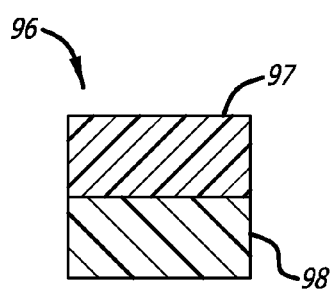
FIG. 14 is a cross-sectional view of the stacked layers of adhesive dots taken along line 14-14 of FIG. 13.

Referring to FIGS. 11-14, in a fourth presently preferred embodiment, the second adhesive layer can also be formed as series of dots, marks, beads or spots 90 having cylindrical, round, cubed, rectilinear, or other shapes, for example, which are shown as having exemplary cylindrical shapes for purposes of illustration, and that may be contiguous or spaced apart. As is illustrated in FIG. 12, the dots, marks, beads or spots may be formed as a series of high 92 dots and low "dots" 94 of adhesive that may be contiguous or spaced apart and that perform in substantially the same way as ridges of adhesive. Referring to FIGS. 13 and 14, the dots, marks, beads or spots may be formed as stacked layers 96 of adhesives with an upper adhesive dot portion 97 and a lower adhesive dot portion 98 that can be the same or different from the upper adhesive dot portion, and that may be contiguous or spaced apart. The adhesive material forming the dots, marks, beads or spots, including upper and lower adhesive dot portions, can be cured adhesives, pressure sensitive adhesives (PSAs), asphalt-based PSAs (rubberized and otherwise), and acrylate based PSAs, as well as hot melt PSAs, which can provide benefits in manufacturing the tile installation mat. The PSA can be applied either as a solvent-borne material or a water-borne material, as a hot melt PSA, or any other methods of application known in the art.

Figure 17:
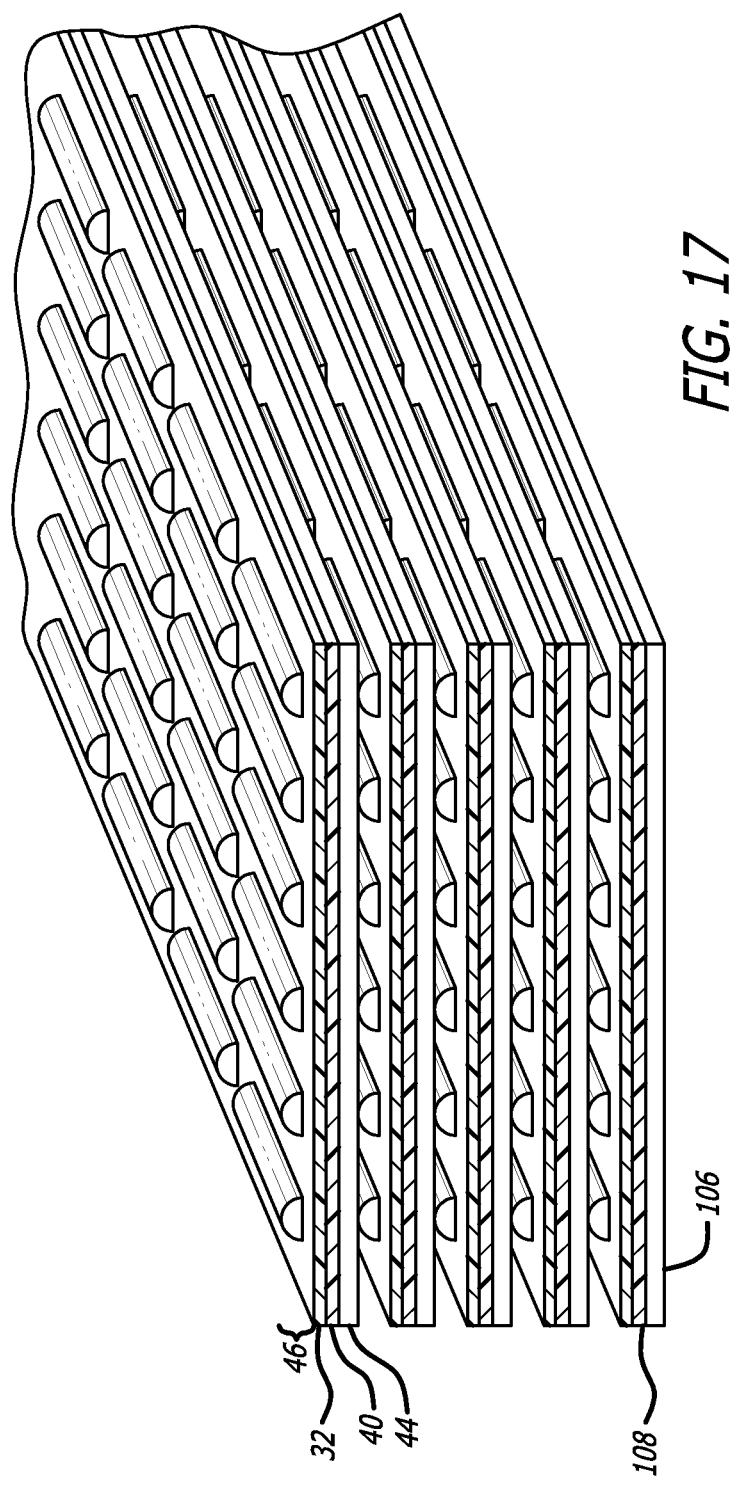
FIG. 17 is a schematic perspective view of a stack of the generally planar adhesive mats of FIG. 16.

Referring to FIGS. 16 to 18, in a fifth presently preferred embodiment, in which like reference numerals refer to like elements of the previous embodiments, the invention provides for a generally planar adhesive mat for installation of architectural covering material to a substrate surface, in which the second adhesive layer is composed of discontinuous ridges 100 (whether made up of dots, marks, beads or spots) spaced apart by gaps 102 of 0.1 to 1 inch typically formed longitudinally between adjacent ridges and between adjacent end portions 104 of the ridges. For example, the ridge 100 may be 1 inch in length followed by 0.25 inch to ⅜ inch end gaps in adhesive, and with longitudinal gaps between ridges similarly 0.25 inch to ⅜ inch, for example. The end gaps allow for cutting and subsequent overlap of successive mats to ensure a waterproof plurality of mats is achieved. In this embodiment, the release function of the second release layer is provided by the first or bottom side 106 of the first release layer, when the mats are collected and stacked in face-to-face relationship, as in when stacking individual mats, as is illustrated in FIG. 17, or when rolling a single long mat into a roll, as is illustrated in FIG. 18. The first release layer is comprised of a first face 106 that is coated with a first release agent and a second opposing face 108 that is coated with a second release agent. The first and second release agents may be the same or different, as is well known in the art, such that release from one face may be preferred relative to release from the other face.

Referring to FIG. 15, in a presently preferred variation of the fourth embodiment, the second adhesive layer can also be composed of discontinuous ridges 100 (whether made up of dots, marks, beads or spots) spaced apart by gaps 102 of 0.1 to 1 inch typically formed longitudinally between adjacent ridges and between adjacent end portions 104 of the ridges. For example, the ridge 100 may be 1 inch in length followed by 0.25 inch to ⅜ inch end gaps in adhesive, and with longitudinal gaps between ridges similarly 0.25 inch to ⅜ inch, for example. The end gaps allow for cutting and subsequent overlap of successive mats to ensure a waterproof plurality of mats is achieved.

Figure 20:
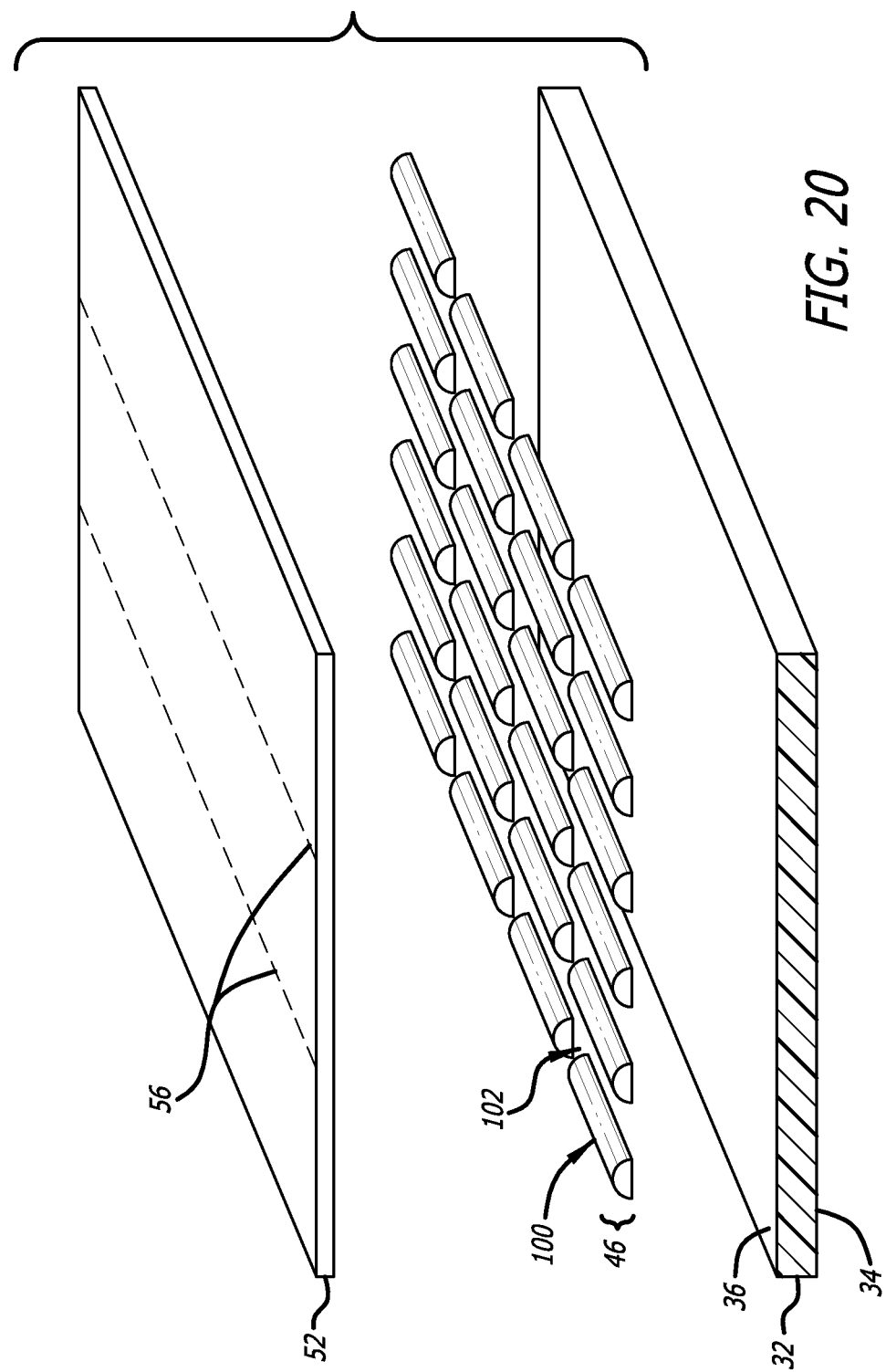
FIG. 20 is an exploded view of the generally planar adhesive mat of FIG. 19.

Referring to FIGS. 19 and 20, in a sixth preferred embodiment, in which like reference numerals refer to like elements of the previous embodiments, the invention provides for a generally planar adhesive mat for installation of architectural covering material to a substrate surface, in which the planar carrier member or carrier sheet layer is formed by a semi-rigid board such as gypsum-based wall board, cement backerboard, or foam backerboard. The semi-rigid board typically can be from 0.2" to 3" thick, depending on the needs of the application. As is best seen in FIG. 20, the carrier sheet layer, formed of a semi-rigid board 32, is coated on a second face 36 with a second adhesive layer 46, with a second release layer 52 covering the second adhesive layer. Referring to FIGS. 19 and 20, while the second adhesive layer is shown as ridges or beads having exemplary cylindrical shapes for purposes of illustration, as is illustrated in FIGS. 10-14, the second adhesive layer 46 can also be formed as a series of dots, marks, beads or spots having triangular, cylindrical, round, cubed, rectilinear, or other shapes, for example, and that may be contiguous or spaced apart. The first face 34 may optionally also be coated with a first adhesive layer, and a first release layer of material (not shown). As is illustrated in FIG. 12, the dots, marks, beads or spots may be formed as a series of high dots 92 and low dots 94 of adhesive that may be contiguous or spaced apart, and that perform in substantially the same way as ridges of adhesive. Referring to FIGS. 13 and 14, the dots, marks, beads or spots may be formed as stacked layers 96 of adhesives with an upper adhesive dot portion 97 and a lower adhesive dot portion 98 that can be the same or different from the upper adhesive dot portion, and that may be contiguous or spaced apart. The adhesive material forming the dots, marks, beads or spots, including upper and lower adhesive dot portions, can be cured adhesives, pressure sensitive adhesives (PSAs), asphalt-based PSAs (rubberized and otherwise), and acrylate based PSAs, as well as hot melt PSAs, which can provide benefits in manufacturing the tile installation mat. The PSA can be applied either as a solvent borne material or a water-borne material, as a hot melt PSA, or any other methods of application known in the art.

In the foregoing embodiments, the adhesive for the first adhesive layer can be any pressure sensitive adhesive that provides strong adhesion under many environmental and job site conditions. Ninety degree peel data on various substrates is provided in Table 1 below.

TABLE 1

Peel strength (90 degree) to various substrates measured 72 hours after adhering the first adhesive layer to the substrate.

|  | Vinyl Laminate | Ceramic Tile | Cleaned Drywall | Gloss-Painted Drywall | Plywood |
|---|---|---|---|---|---|
| Average Peel Strength (pounds per linear inch) | 5.7 | 6.1 | 2.0 | 5.4 | 2.6 |

In the foregoing embodiments, the second adhesive layer should have the following properties: 1) The second adhesive layer should have viscoelastic behavior allowing dimensional stability after curing (drying, cooling, or other curing behavior) so as to maintain the structure of the ridges during storage and handling. 2) The second adhesive layer should be deformable when placed under pressure such that the adhesive will conform to the impinging architectural covering material surface thereby increasing the interfacial contact between the adhesive and the architectural covering material with increasing pressure. 3) The second adhesive layer should have sufficient adhesion under minimal pressure such that a tile will not fall off when adhered in a vertical position (as to a wall), while still being removable with minimal hand pressure. 4) The second adhesive layer should have sufficient adhesion under the application of firm hand pressure to architectural covering material to the second adhesive layer to dramatically increase the adhesion such that it is difficult or impossible to remove the architectural covering material by hand. 5) The second adhesive layer can include fillers and/or adjuvants common in the art that can be used to extend and/or modify the properties of the adhesive. An exemplary adhesive for the first and the second adhesive layer is sold under the name DF 674, available through Deccofelt Corporation of Glendora, Calif.

The ability to adhere a tile to the second adhesive layer with minimal pressure has been demonstrated by the following example. The second adhesive layer of the adhesive mat was adhered to a 12"×12" piece of plywood, and this was set in a horizontal position on a lab bench, with the second adhesive layer facing up. A tile was gently dropped from a minimal height of less than 0.25 inches, thereby using the force of gravity alone to adhere the tile to the second adhesive layer. One edge of the plywood was lifted such that the plywood/adhesive mat/tile assembly was in a vertical position, and the assembly was gently shaken to determine if the tile would move or fall off the vertical surface. The tile adhered to the plywood/adhesive mat assembly did not move or fall off when gently shaken, but was removable manually. A tile adhered to such an adhesive mat according the present invention should not move or fall off when gently shaken, but should be removable manually by gripping the tile with one's hands, with minimal force, and without the use of tools to pry the tile from the plywood/adhesive mat assembly. The ability of an adhesive mat according the present invention to irreversibly hold the tile after repositioning and firmly pressing the tile in place was determined by tensile measurement of a 4"×4" ceramic wall tile having a nominally flat back, i.e. without ridges or other designed deformation installed on an adhesive mat according to the present invention. The typical tensile strength of a currently preferred embodiment is 2.5 psi after 24 hours and over 5 psi after 7 days.

In another presently preferred aspect, the present invention provides for a premixed grout with strong adhesion to the covering material and the mat. The grout should substantially cure within 24 hours and be water resistant. A presently preferred grout is a polymer-based premixed grout sold under the name SIMPLE GROUT, manufactured by Custom Building Products of Seal Beach, Calif. The exemplary premixed grout, in combination with the adhesive mat of the invention, forms an unexpectedly stronger system than if cementitious grout is used. To demonstrate this, tile assemblies consisting of a cementitious backer board, the adhesive mat of the invention, and nine 4 inch wall tiles (forming a 3 tile by 3 tile square with ¼ inch grout joints) were grouted with both premixed grout or cementitious grout. After curing for seven days, the assembly was placed in a stress-train machine to measure the force required to pull the central tile from the assembly in a direction orthogonal to the tile surface. Without grout, the force required to remove the tile is approximately 90 pounds (5.6 psi). The force required for removing the cementitious grout was approximately 110 pounds (6.9 psi), whereas the force required to remove the tiles grouted with premixed grout was approximately 150 pounds (9.4 psi, 36% higher than with cementitious grout). While it is believed that the cementitious grout is suitable for many applications, the increased strength with the premixed grout imparts robustness to the overall system.

The overall strength of the system depends on the physical, chemical and dimensional properties of the second adhesive layer. With larger ridges and the premixed grout, the tensile force required to remove the central tile was approximately 200 pounds (12.5 psi), whereas with smaller ridges the force required is approximately 150 pounds (9.4 psi). Under these conditions the tiles typically break at approximately 200 pounds (12.5 psi). To install small mosaic tiles, often as small as ¾" on a side, it is preferred to have at least two ridges of adhesive supporting each tile. Thus for this application the spaces between ends of adjacent ridges should preferably be less than or equal to ⅜ inch. Likewise, the longitudinal space between adjacent ridges in the direction of the ridge should be less than or equal to ⅜ inch. The length and width of the ridges of adhesive can be variable, provided enough adhesive is applied, such that together the portions of the second adhesive layer preferably provide an adhesive coverage of the second surface in the range of approximately 5-20% total coverage, and more preferably approximately 10% total coverage, consistent with achieving appropriate "minimal pressure" and "firm pressure" adhesion between the second adhesive layer and the architectural covering material. The height of the ridges typically should be larger than deviations in the underside of the architectural covering material. For instance, ceramic tile often has indentations from a grid pattern that may be 1/32-1/16 inch in depth. Thus, a ridge height of 1/16 inch would be appropriate. Larger or smaller indentations in a surface covering material could require adhesive ridges of greater or lesser height.

In the method of the invention, the generally planar adhesive mat can be applied to a substrate surface such as a building surface, floor or wall, by removing the first release liner, aligning the adhesive mat on the surface, and pressing the adhesive mat onto the substrate surface to adhere the adhesive mat to the substrate surface. The installer can pause after adhering the adhesive mat to the substrate surface before applying the covering material to the adhesive mat. The covering material then can be set onto the adhesive mat by removing the second release liner, aligning the covering material, and pressing the covering material, typically gently at first, onto the second adhesive layer. The covering material then can be easily repositioned by lifting or pushing the covering material laterally, re-setting the covering material in a desired position, after which the covering material can be pressed firmly into the second adhesive layer to permanently adhere the covering material in position on the substrate surface. When covering material such as tile is gently set into the second adhesive layer in this manner, the covering material can be re-set at any time to reposition and re-align the tile. There are practically no open time or adjustment time limitations. Additionally, since the second release layer of material can be perforated or formed as separate strips, the installer can easily remove desired portions of the second release layer to expose only as much of the second adhesive layer as is necessary.

With the current invention, the covering material such as tile can be grouted immediately after it is firmly set into the second adhesive layer. The use of a premixed grout, along with being easy to use, also brings significant strength improvement to the final assembly. The system and method for mortarless tile installation of the invention make the installation of covering materials such as tile cleaner, easier and more accessible to those not trained in the art of tile installation and overcomes many of the challenges associated with mortar-based tile installation.

Alternate embodiments of a system and method for installation of an architectural covering material to a substrate surface, such as a wall, floor, counter, backsplash, tub/shower surround, or other building surface are illustrated in FIGS. 21-26. As previously discussed, the architectural covering material may be any commonly known material in the art such as wood, carpet, tile, brick fascia, linoleum and the like, for example.

More particularly, FIG. 21 illustrates a tile installation system 201 for installing an architectural covering material. The tile installation system 201 includes a plurality of discrete portions of adhesive material 200 deposited onto a release sheet 244 (also called a release liner 244). The release sheet temporarily carries or contains the discrete portions of adhesive substrate 200. The plurality of adhesive material portions 200 allow a covering material to be re-positioned before being firmly pressed and attached.

As is illustrated in FIG. 21, the adhesive material portions 200 can be formed as a series of discontinuous portions spaced apart a distance 202 between ends 204 of the adhesive substrate portions. The adhesive material portions 200 may be a material formed of cured adhesives, pressure sensitive adhesives (PSAs), asphalt-based PSAs (rubberized and otherwise) and acrylate based PSAs, as well as hot melt PSA. The PSA can be applied either as a solvent borne material or a water-borne material, as a hot melt PSA, or any other methods of application known in the art. Those skilled in the art will appreciate the adhesive substrate portions 200 may be of any shape, including, but not limited to cylindrical, semi-cylindrical, round, cubed, spherical, ovoid, rectilinear, or any other shape. While the adhesive substrate portions are illustrated in FIG. 21 as semi-cylindrical, FIG. 22 illustrates another embodiment of a tile installation system having a release sheet 244 having a plurality of discrete adhesive substrate portions 300 having an alternate cylindrical shape, for example. The plurality of discrete adhesive substrate portions 300 each have ends 304 and are spaced a distance 302 between ends 304.

In another presently preferred embodiment, the discrete adhesive substrate portions have a core-shell structure. Referring to FIG. 23, the discrete adhesive substrate portions 402 each include a shell layer 404 and a core layer 406. The shell layer 404 provides temporary adhesives and the core layer 406 provides permanent adhesives that may be released and triggered by the rupture of the shell layer 404. Examples of a permanent core adhesive include, but are not limited to, polymer latex, such as acrylic or SBR, hot melt adhesive, moisture cure urethane, moisture cure cyanoacrylate, reactive epoxy resin, reactive urethane or urea, and prepolymers of any of the aforementioned resins. Those skilled in the art will appreciate that reactive resins, such as epoxy or urethane, may be comprised of two parts which initiate the reaction upon contact. The core layer 406 may be further engineered to ensure stronger permanent adhesion, for example, by containing rigid fibers to induce mixing of components when the shell layer 404 ruptures.

Examples of materials for the shell layer 404 include, but are not limited to, cellulosics, fiber reinforced minerals, cementitious materials and organic binders. Optionally, in an alternate embodiment, the shell layer 404 may contain reactive components, such as amine that servers as an epoxy or urethane/urea hardener. Alternately, the shell layer 404 may contain a cementitious material that may form expansive hydration compound, such as ettringite, to burst, or rupture the shell layer upon contact with moisture. The shell layer 404 may be further engineered to provide enhanced re-positioning ability such as by implanting fibrous compound around a pressure sensitive adhesive.

Referring back to FIG. 21, the release sheet 244 may be formed of a sheet material, such as a flexible or inflexible polymeric material, such as polyethylene or polypropylene sheets, or other similar materials, for example. In one embodiment, the release sheet 244 is formed of a sheet material that is flexible so that the release sheet may be manufactured in a roll. The release sheet material may also be formed of woven and non-woven materials, such as polyester or fiberglass or other similar materials, for example. The release sheet 244 may also be moderately deformable to allow for adherence to slightly uneven surfaces without wrinkling. In order to provide assistance to a user in aligning and positioning covering materials, the release sheet 244 may be printable. For example, the release sheet may be provided with a grid, or another measuring and aligning system to facilitate more accurate placement of covering material.

Referring to FIG. 24, a plurality of release sheets 244 are collected and stacked upon each other. In this example each release sheet 244 has a bottom side surface 234 and top side surface 236. The plurality of adhesive substrate portions 200 are deposited on each of the top side surface 236 of the release sheets 244. The top side surface 236 of the release sheet 244 has a stronger bonding to the adhesive portions 200 than does bottom side surface side 234 of adjacent release sheet 244. Different bonding characteristics of the top and the bottom layers of the release sheet can be achieved by applying a different amount or different types of release coating, such as alkylsilane coatings. When a release sheet 244 is removed from the stack, it allows the weaker bonding surface side (i.e., the bottom side surface 234) to break away from the plurality of adhesive substrate portions, thereby leaving the adhesive portions intact on the stronger bonding surface (i.e, the top side surface 236 of the release sheet). Additionally, once the top stacked release sheet has been removed, the discrete adhesives 200 may be transferred to either the back of an architectural covering, such as a tile, or to the surface of a substrate.

In an alternate embodiment, the release sheet 244 is a single long sheet and is stored as a roll as illustrated in FIG. 24. The release sheet has a top side surface 236 and a bottom side surface 234. The discrete portions of adhesive substrate are deposited on the top side of the surface which has a stronger bonding affinity to the adhesive substrate.

Figure 26:
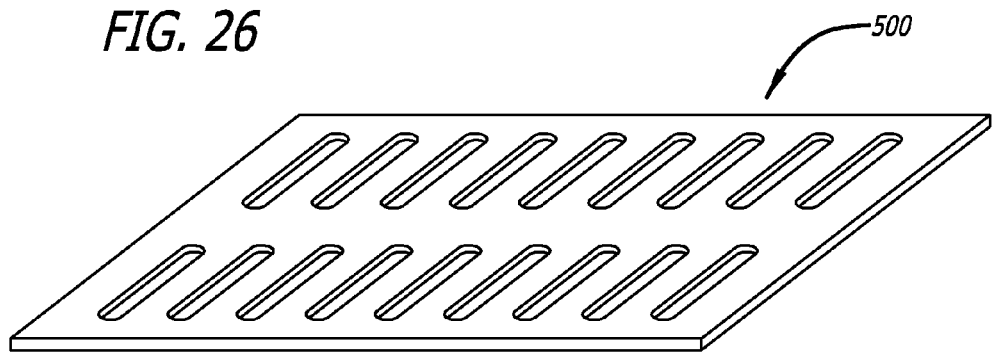
FIG. 26 is a perspective view of a release sheet thermoformed such that it forms a mold for the adhesive.
Figure 27:
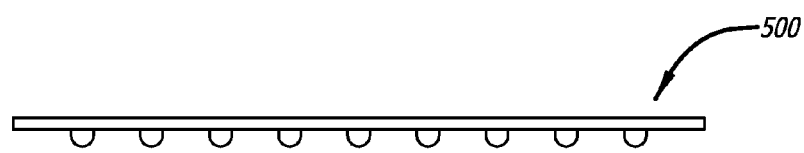
FIG. 27 is an edge view of the release sheet of FIG. 26.
Figure 28:
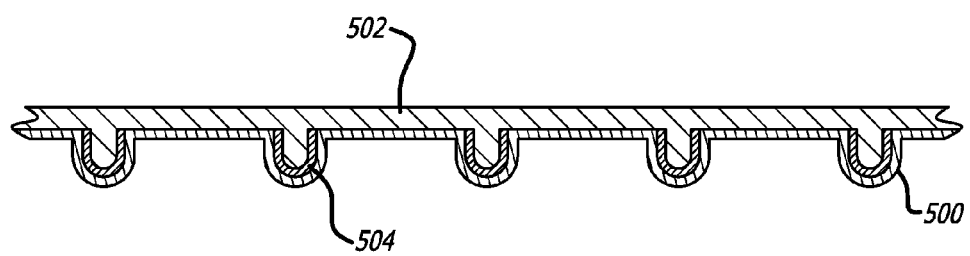
FIG. 28 is an edge view of the release sheet of FIG. 26 after adhesive has been deposited into the mold.

In a further alternate embodiment of a system and method for installation of an architectural covering material to a substrate surface, such as a wall, floor, counter, backsplash, tub/shower surround, or other building surface, a method of manufacturing of adhesive sheets having glue ridges, dots, beads, cylinders, etc. may include thermoforming a release sheet 500 such that it forms a mold for the adhesive, as illustrated in FIGS. 26 and 27. A screed or blade or other method known in the art is used to distribute liquid glue 502 (FIG. 28), such as for example a hot melt at an elevated temperature, into and across the thermoformed release liner, filling the thermoformed indentations in the thermoformed release liner. A thin layer of the glue 502 may be left on the surface of the adhesive sheet. Different shapes, such as ridges, dots, beads, cylinders, etc., can be formed via this method of manufacturing.

The method of adhering the adhesive sheet onto a tile at the end of the manufacturing of the tile may be accomplished by joining the adhesive side of the sheet to the tile. A thermoforming machine may be used to mold the edges of the adhesive sheet around the tile.

In another alternative embodiment, a thermoplastic sheet is molded to provide indentations in preferred shape (ridges, dots, beads, cylinders, etc). In a subsequent step the mold is coated with a "temporary" PSA 504 (FIG. 28) as is known in the art (such, as a non-limiting example, as is used in "sticky notes"). In a subsequent step the adhesive is deposited into the mold, potentially leaving a thin layer of permanent adhesive on the top of the adhesive sheet.

In this case, the thin permanent adhesive layer 502 can act to stick the adhesive sheet to the tile back. When the tile is to be applied to a substrate such as backsplash, countertop, etc., the thermoplastic mold can be separated from the adhesive at the temporary PSA layer 504. Pressing the tile firmly into the substrate permanently affixes the tile. A benefit of the last embodiment is that the tile with the adhesive sheet so attached can be cut with a tile wet saw and the adhesive will remain covered and dry except for the edges of the cut. After gently drying the tile as by patting the wet portions with a paper towel, the tile can be adhered to substrate by subsequent removal of the release sheet/mold and pressing the tile, first gently, then firmly into place.

It is noted that the drawings herein are not engineering drawings, and specific dimensions are not to be taken from the drawings. For example, in some cases, dimensions such as thicknesses of adhesive layers and other dimensions have been modified in the drawings for purposes of illustration.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A method of manufacturing an adhesive sheet having at least one of glue ridges, dots, beads, cylinders, and permanently adhering the adhesive sheet to a tile, the method comprising the steps of:

thermoforming a release sheet such that it forms a mold having indentations for adhesive;

distributing liquid adhesive in a single layer into and across the release liner to fill the thermoformed indentations in the thermoformed release liner;

joining the single layer of adhesive on an adhesive side of the adhesive sheet to the tile; and molding the edges of the adhesive sheet around the tile with a thermoforming machine.

2. A method of molding a thermoplastic sheet, the method comprising the steps of:

molding a thermoplastic sheet to provide indentations in a preferred shape to form a mold;

coating the mold with a temporary pressure sensitive adhesive;

depositing a permanent adhesive into the mold to leave a thin layer of the permanent adhesive on the top of the adhesive sheet;

sticking the thin permanent adhesive layer to the tile back to adhere the adhesive sheet to the tile;

applying the tile to a substrate;

separating the thermoplastic mold from the adhesive at the temporary pressure sensitive adhesive layer;

pressing the tile onto the substrate to permanently affix the tile.

3. An installation system for installing architectural covering material to a substrate surface, comprising:

a release sheet and a plurality of discrete adhesive substrate portions positioned on the release sheet;

wherein each discrete adhesive substrate portion comprises an adhesive material having a shell layer and an adhesive core layer, wherein the shell layer is rupturable to facilitate adhesion;

wherein the core layer of the discrete adhesive contains a permanent adhesive and is applied via rupturing of the shell layer; and wherein the shell layer is a non-adhesive layer;

wherein the release sheet has a top side surface and a bottom side surface, and wherein the top side surface has a stronger bonding affinity with the discrete adhesive substrate portions than the bottom side surface, wherein the bottom side surface is releasable from the discrete adhesive substrate when in contact therewith.

4. The installation system of claim 3, wherein the core layer of the adhesive material comprises a permanent gel material.

5. The installation system of claim 3, wherein the core layer of the adhesive material comprises a permanent viscous material.

6. The installation system of claim 3, wherein the release sheet is stored in a roll.

7. The installation system of claim 3, wherein the release sheet is formed from a polymer.

8. The installation system of claim 3, wherein the release sheet is formed from a sheet material selected from the group consisting of polyethylene, polypropylene, woven polyester, woven fiberglass, non-woven polyester, non-woven fiberglass.

9. The installation system of claim 3, wherein the plurality of discrete adhesive substrate portions are pressure sensitive and are formed in the shape of one of a sphere, ellipsoid and cylindrical.

10. The installation system of claim 3, wherein the plurality of discrete adhesive substrate portions are spaced apart in a pattern.

11. The installation system of claim 3, wherein the plurality of discrete adhesive substrate portions are spaced apart on a grid.

12. The installation system of claim 3, wherein the plurality of discrete adhesive substrate portions are spaced apart in a pattern and are at least partially cylindrical.

13. The installation system of claim 12, wherein the discrete adhesive portions have ends, the space between ends of adjacent discrete adhesive portions being less than or equal to ⅜ inch.

14. The installation system of claim 3, wherein the plurality of discrete adhesive substrate portions are spaced apart in a pattern in which there is a gap of between 0.1 inch and 1.0 inch between discrete adhesive substrate portions.

15. The installation system of claim 14, wherein the plurality of discrete adhesive substrate portions are spaced apart in a pattern in which there is a gap of between ¼ inch and ⅜ inch between adjacent discrete adhesive substrate portions in at least one direction.

16. The installation system of claim 3, wherein the plurality of discrete adhesive substrate portions are provided on an adhesive mat.

17. The installation system of claim 16, wherein the mat includes an adhesive layer on a first side and the discrete adhesive substrate portions on a second side.

18. The installation system of claim 17, wherein the installation system further includes a second release layer, which covers the adhesive layer that is on the first side of the mat.

19. The installation system of claim 18, wherein at least one of the release sheets is provided with a grid.

20. The installation system of claim 16, wherein the adhesive mat has a tensile strength of at least 2.5 psi after 24 hours and a tensile strength of over 5.0 psi after seven days.

\* \* \* \* \*